United States Patent
Yang et al.

(10) Patent No.: US 8,088,202 B2
(45) Date of Patent: Jan. 3, 2012

(54) HEAT EXCHANGE TOWER AIRFLOW APPARATUS AND METHOD

(75) Inventors: Jidong Yang, Overland Park, KS (US); Glenn S Brenneke, Lee's Summit, MO (US); Eldon F Mockry, Lenexa, KS (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 979 days.

(21) Appl. No.: 12/016,359

(22) Filed: Jan. 18, 2008

(65) Prior Publication Data
US 2009/0183854 A1 Jul. 23, 2009

(51) Int. Cl.
*B01D 53/00* (2006.01)
(52) U.S. Cl. .............. 96/297; 96/300; 261/98; 261/118; 261/154
(58) Field of Classification Search ............... 261/94, 261/98, 118, 152, 154; 96/297, 300; 55/418; 165/53
See application file for complete search history.

(56) References Cited

U.S. PATENT DOCUMENTS

| | | | |
|---|---|---|---|
| 2,016,086 A * | 10/1935 | Fisher | 261/79.2 |
| 3,065,587 A * | 11/1962 | Fordyce et al. | 55/442 |
| 3,575,387 A | 4/1971 | Bradley, Jr. et al. | |
| 3,963,464 A | 6/1976 | Schinner | |
| 4,156,706 A | 5/1979 | Bell, Jr. et al. | |
| 4,991,646 A | 2/1991 | Spears | |
| 2007/0132116 A1 | 6/2007 | Mockry et al. | |
| 2007/0240445 A1 | 10/2007 | Morrison et al. | |

\* cited by examiner

*Primary Examiner* — Robert A Hopkins
(74) *Attorney, Agent, or Firm* — Baker & Hostetler LLP

(57) ABSTRACT

A heat exchange tower has an external structure including opposed sidewalls, a front barrier wall, an inlet opening below the front wall, and a rear barrier wall having an outlet at a generally upper region. A fill material generally spans the inside within the four walls, and is generally disposed above the top of the inlet and below the bottom of the outlet. A baffle protrudes inwardly from the rear barrier wall inside the tower and is located at a height above the top of the fill and below the bottom of the air outlet. A primary drift eliminator structure spans generally across the tower, and is located at the height of the baffle, so they connect to each other. A supplemental drift eliminator is provided above the primary drift eliminator, adjacent an inward edge of the baffle. At least one air turning vane angled in a generally vertical direction is provided below the fill media. An air inlet guide projects outwardly from the front wall above the inlet.

17 Claims, 1 Drawing Sheet

HEAT EXCHANGE TOWER AIRFLOW APPARATUS AND METHOD

FIELD OF THE INVENTION

The invention pertains generally to the field of heat exchange towers including cooling towers and heating towers. The invention further pertains to apparatuses and methods that improve the airflow through such towers.

BACKGROUND OF THE INVENTION

Various types of heat exchange towers are in wide use in industry. Such towers include cooling towers which are utilized to cool a fluid by contact with ambient air, as well as heating towers which are used to heat a fluid by contact with ambient air. In the case of such towers, a fan typically blows air through the tower, with air pulled into an inlet at the bottom or sides of the tower. Inside the tower, the air typically passes through a fill media which may, for example, include splash bars or a pack of corrugated sheets. In some towers, fluid to be heated or cooled may be sprayed from above the fill so that it falls through the fill, so that the interaction of the air and the fill will impart heating or cooling to the fluid as it falls. The fluid is then typically collected in a basin at the bottom of the tower.

One application for heating towers is in the field of liquid natural gas (LNG) vaporization. One example of an LNG tower would be to take cold fluid from an LNG condenser and heat it using the ambient air before returning the fluid to the condenser.

Various types of tower arrangements are known, including, for example, a counterflow tower in which the air enters and leaves from opposed sides of the tower, or a counterflow tower where air typically enters via one or more inlets at the lower side of the tower below the fill and is exhausted by a fan outlet either upwardly out of the top of the tower, or sideways out of an outlet in a top side of a tower above the fill.

In such arrangements, it is generally desirable to reduce the energy load that must be imparted by the fan in order to draw the desired airflow through the system. This reduces the total energy use of the tower and therefore makes it more economically and environmentally efficient. Also, it is generally desirable to achieve a relatively even distribution of airflow velocity, across all regions of the fill material. Many tower designs are known which have desirable characteristics; however, there is always a need in the art for improved airflow management.

SUMMARY OF THE INVENTION

The above needs are met, at least to some extent, by an improved heat exchange tower system and method according to various embodiments of the invention.

An embodiment of the present invention includes a heat exchange tower which has a structure including two opposed side barrier walls, a front barrier wall having an inlet opening below a bottom edge thereof, and a rear barrier wall having an outlet at a generally upper region thereof, a fill material spanning generally horizontally across at least part of the inside of the structure, and disposed at a height above the top of the inlet opening and below the bottom of the outlet opening, and a baffle protruding inwardly from the rear barrier wall inside the tower.

Another embodiment includes a heating tower which has a structure including two opposed side barrier walls, a front barrier wall having an inlet opening below a bottom edge thereof, and a rear barrier wall having an outlet opening at a generally upper region thereof, a fill material spanning generally horizontally across at least part of the inside of the structure, and disposed at a height above the top of the inlet opening and below the bottom of the outlet opening, and means for blocking air protruding inwardly from the rear barrier wall inside the tower.

Yet another embodiment consists of affecting air flow in a heat exchange tower comprising providing a structure including the opposed side barrier walls, a front barrier wall having an inlet opening below a bottom edge thereof, a rear barrier wall having an outlet opening, at a generally upper region thereof, a fan at the outlet opening, and a fill material spanning generally horizontally across at least part of the inside of the structure, and disposed at a height above the top of the inlet opening and below the bottom of the outlet opening, and directing air flow using a baffle protruding inwardly from the rear barrier wall inside the tower.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
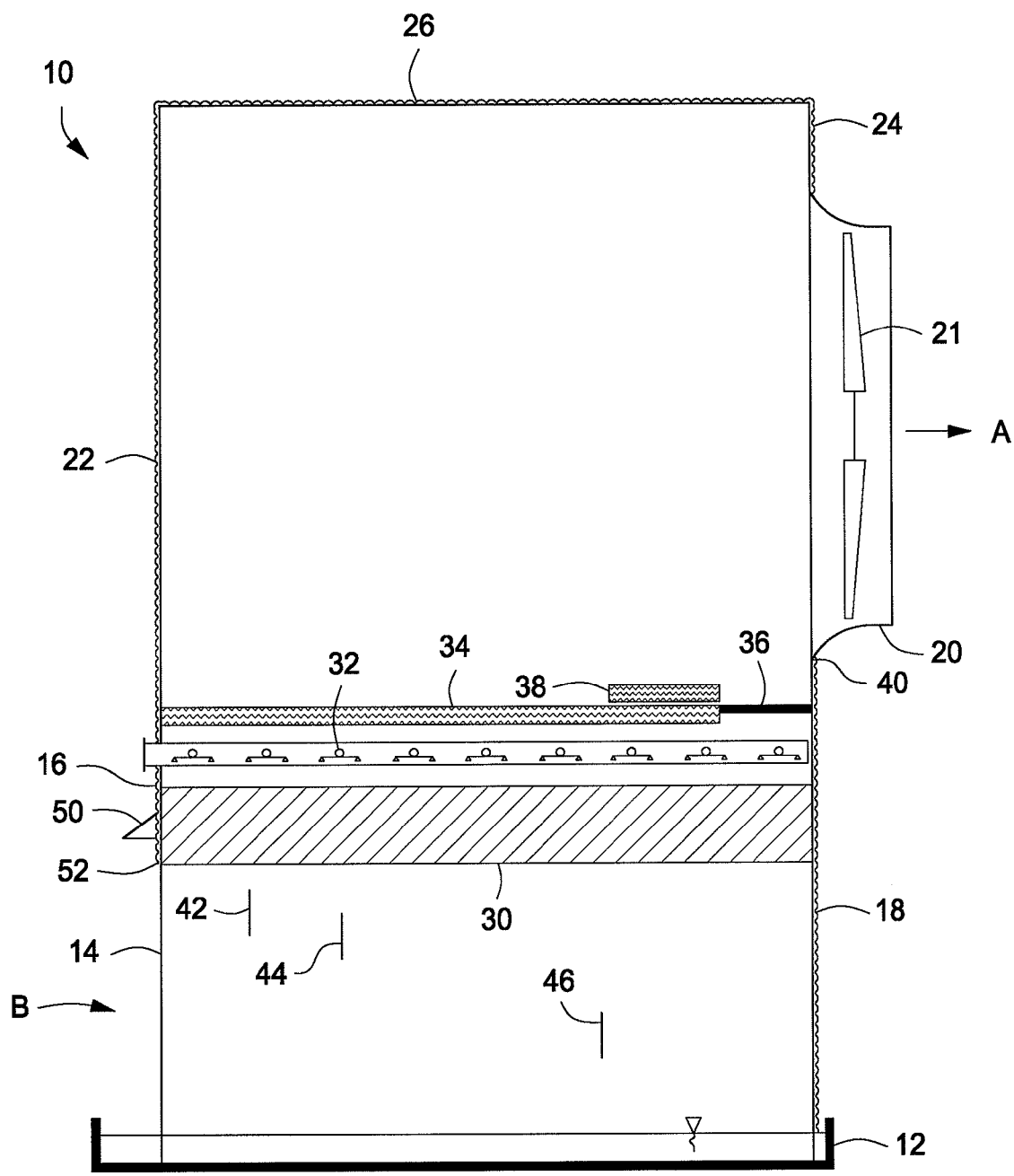
FIG. 1 is a cross-sectional schematic view of a heat exchange tower according to a preferred embodiment of the present invention, embodied as an LNG heating tower.

Preferred embodiments of the present invention by way of examples will now be described with reference to the drawing figures and accompanying reference numerals referred to below. In one embodiment, a heat exchange tower has an external structure including opposed front and rear barrier walls, an inlet side barrier wall having an inlet opening at a generally lower region thereof, a rear barrier wall having an outlet at a generally upper region thereof, a fill material generally spanning the inside within the four walls (and generally disposed above the top of the inlet and below the bottom of the outlet), and a baffle protruding inwardly from the rear barrier wall inside the tower. A supplemental drift eliminator, air turning vanes, and an air inlet guide are also provided.

FIG. 1 is a cross-sectional schematic view of a heat exchange tower according to one preferred embodiment of the present invention. The tower in this example is utilized as an LNG heating tower, but principles of the invention may be applied to towers in various applications, including other heating towers and/or cooling towers.

Turning now to FIG. 1, a tower 10 is shown having a lower basin 12 which can collect the heat exchange fluid, an air inlet 14 and a front barrier wall 16, as shown. The inlet 14 will typically be an open sidewall, although some framework may be present. A rear barrier wall 18 is at the other side opposing the inlet 14 and are front barrier wall 16, and the front and rear barrier walls 16 and 18 are both solid walls that do not permit airflow therethrough. Not shown in the drawings, but also serving as barrier walls would be two sidewalls that are parallel to each other but perpendicular to the barrier walls 16 and 18. Those sidewalls typically extend the higher height of the tower. In a plane view, the walls 16, 18 and the sidewalls together form a rectangular enclosure.

An outlet fan shroud 20 is provided opposite the air inlet 14, and includes a powered fan 21 that blows air outwardly in the direction labeled by the arrow A. The upper portion of the tower includes a front barrier wall 22, rear barrier wall 24 and upper barrier roof 26. A fill material 30 spans across the inside of the tower as illustrated. The fill material 30 may be, for example, a cross-corrugated sheet type fill pack material, or may be any other suitable fill material. The fill is designed so that air can flow in the inlet 14 in the direction shown by arrow B and then upward through the fill material 30. A number of fluid spray heads 32 are provided above the fill material 30, and spray the fluid to be heated or cooled downwardly onto the fill material. The heat exchange fluid may be clean water, dirty water, or even salt water or other liquid. Typical additives may be used. In the case of an LNG heating tower, the heating process actually in some cases condenses water from the air, and so more water will actually collect in the basin than is sprayed by the spray heads 32. Thus, a provision (not shown) may be needed to remove excess water that is created by the tower. The condensed water typically is very clean, and therefore if the system is run with clean water, it can have the benefit of producing, at no extra cost, a supply of relatively clean water which may be used for example for other industrial purposes.

Returning to FIG. 1, above the spray heads 32 is a band comprising drift eliminators 34. The drift eliminators are a type of fill that removes entrained circulating water particles from the air stream that might other exit the tower through the outlet 20. In the particular embodiment illustrated, the drift eliminator band 34 does not span the entire width of the tower interior between the front and rear walls, because in this embodiment, an interior outlet air baffle 36 is provided which will be discussed in more detail below. Also in this embodiment, a supplemental second band of drift eliminator 38 is provided above the drift eliminator band 34 spanning partially from the edge of the baffle 36.

The characteristics and operation of the baffle 36 will now be described in more detail. It will be appreciated that at the junction corner 40 formed by the top of the barrier wall 18 and the beginning of the outlet 20, if the baffle 36 were not present the air would tend to need to turn at a fairly sharp corner in the area generally inside the corner 40. Also, since air is tending upwardly through the entire tower, and then is being exhausted sideways by the fan 21 at the outlet 20, because of the low pressure caused by the fan 21, without the baffle 36 the air would tend to have an extra high speed flow characteristic in this area near the corner 40. Therefore, the baffle 36 is provided extending inwardly from the rear wall 18 of the tower, at a location above the top of the fill material 30 and below the lowest point of the outlet 20. In the illustrated example, the baffle 36 is a solid barrier in the form of flat or corrugated metal, wood or fiber reinforced plastic. Other completely or substantially non-porous materials may be used. Due to the low pressure caused by the fan 21, sufficient airflow still exists through the fill material 30 in the area generally near the rear wall 18, but the baffle 36 helps keep this airflow to a more even velocity profile across the entire span of the fill 30.

As an additional feature, in order to reduce a relatively high airflow rate that would tend to occur around the edge of the baffle 36 where it adjoins the drift eliminators 34, a second, supplemental thickness of drift eliminator 38 is provided as illustrated. This second, supplemental drift eliminator 30 spans a selected distance partially inward from the location of abutment of baffle 36 and drift eliminators 34. The supplemental drift eliminator 38 helps to reduce the airflow volume that would otherwise be high in this area.

The tower 10 includes an internal support framework structure, which is not illustrated in order to provide clarity of the features which are illustrated. The support structure is typically a wooden, fiber reinforced plastic, or metal framework including columns and girts. The framework is a framework that supports the exterior tower walls, as well as an internal framework that supports the rest of the tower structure, including the fill 30, spray heads 32, and drift eliminators 34 and 38. The baffle 36 may also be supported by this framework, or may be cantilevered inwardly from the barrier wall if desired. Turning next to the region below the fill 30 and above the basin 12, this region is a generally open space having the aforementioned lattice support structure disclosed therein.

Another feature which assists with managing the airflow profile inside the tower 10 is the provision of a first air turning vane 42, a second air turning vane 44 and/or a third air turning vane 46, as shown. Any one or all three of these turning vanes may be employed, or additional turning vanes may be employed as well as turning vanes being located at different locations. The locations illustrated are preferred, but are by way of example only. Each of these turning vanes 42, 44 and 46 is a flat solid barrier, typically in the form of a flat board, although they may be of wood, metal, plastic or any other type of panel material and could be corrugated. As has been noted above, the presence of the outlet 20 and the fan 21 at the opposite side of the tower, will tend to draw air through the region more to the right side of the fill 30, although the profile is controlled to a degree by the baffle 36. Each of the vanes 42, 44 and 46 typically extend the depth of the tower between the sidewalls, and has a height and location selected to assist with "turning" the incoming air so that it is directed upwardly into the fill 30 with a relatively even airflow distribution profile across the fill 30. In addition a low pressure area will be formed behind each turning vane, which will help turn the air that goes below the respective vane.

For example, air will tend to impact with the first vane 42, and be directed upward into the left side of the fill 30. Air somewhat lower will tend to run into the second turning vane 44 and be directed into the fill 30 at a location generally above the turning vane 44. Further, air traversing along a relatively lower portion above basin 12 will impact the third turning vane 46 and thus be directed upwards into a region of the fill 30 generally above the turning vane 46.

Another air management feature that can be provided in a preferred example of the tower 10 is an air inlet guide 50 as shown. The air inlet guide 50 is mounted to the outside of the front barrier wall 22, at a location at or near the bottom of the barrier wall 22, and above the inlet 14. This air inlet guide 50 projects outwardly and downwardly in a preferred embodiment, in the shape of an awning, and assists with air flow that is being drawn into the inlet 14. Particularly, to the extent some air flow is coming from above the inlet 14, it has been found that the air inlet guide 50 facilitates turning of the air in the region near the corner 52 formed by the bottom of the front wall 22.

Accordingly, the preferred embodiment illustrated in FIG. 1 provides four mechanisms for improved management of air flow through the tower 10. A first mechanism is the provision of an interior baffle 36 in the form of a generally horizontal baffle which is above the fill material and below the outlet 20. In some embodiments a benefit may be obtained by locating the baffle differently, such as, for example, providing one or more baffles at locations higher above the fill material 30, even in a region of the outlet 20, or below the fill material 30. Moreover, the baffle in some applications may not be completely horizontal, but rather may be angled with respect to the horizontal.

A second mechanism for improving the air flow is the provision of a supplemental drift eliminator section 38 at any desired location, but in the illustrated example at a location inboard from the baffle 36 and on top of the primary drift eliminator section 34.

A third mechanism for improving the air flow is the provision of generally vertical air turning vanes 42, 44 and/or 46 at various location below the fill 30. One or more vertical vanes may be provided, and may be turned at some angle with respect to vertical if desired.

A fourth mechanism for managing air flow through the tower 10 is the provision of an air inlet guide 50, which is a structure projecting outward from the exterior wall 22 of the tower at a location at or above the top of the air inlet 14. It may also be desirable to provide supplemental turning guides in the region of the inlet 14, or to move the air inlet guide 50 upward or downward from the position illustrated.

The particular dimensions of each component, and their relative placement and size with respect to each other, will depend, of course, on the individual requirement and size of the specific tower. Therefore, FIG. 1 is not intended to show a scale nor imply any particular dimensions or sizes. Rather, FIG. 1 illustrates the concept of placement of an interior inwardly projecting baffle 36, one or more turning vanes 42, 44 and 46, supplemental drift eliminators 38, and an exterior outwardly projecting air inlet guide 50.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A heat exchange tower comprising:
  a structure having two opposed side barrier walls, a front barrier wall having an inlet opening below a bottom edge thereof, and a rear barrier wall having an outlet at a generally upper region thereof;
  a fill material spanning generally horizontally across at least part of the inside of the structure, and disposed at a height above the top of the inlet opening and below the bottom of the outlet opening;
  a baffle protruding inwardly from the rear barrier wall inside the tower; and
  a primary drift eliminator band spanning generally horizontally across at least part of the tower wherein the primary drift eliminator and the baffle are at the same height and connect to each other.

2. A tower according to claim 1, wherein the baffle is located at a height above the top of the fill.

3. A tower according to claim 1, wherein the baffle is located at a height below the outlet opening.

4. A tower according to claim 1, further comprising a supplemental drift eliminator provided above the primary draft eliminator and adjacent an inward edge of the baffle.

5. A tower according to claim 1, further comprising at least one air turning vane angled in a generally vertical direction and provided below the fill media.

6. A heat exchange tower comprising:
  a structure having two opposed side barrier walls, a front barrier wall having an inlet opening below a bottom edge thereof, and a rear barrier wall having an outlet at a generally upper region thereof;
  a fill material spanning generally horizontally across at least part of the inside of the structure, and disposed at a height above the top of the inlet opening and below the bottom of the outlet opening;
  a baffle protruding inwardly from the rear barrier wall inside the tower; and
  an air inlet guide projecting outwardly from the front barrier wall above the inlet opening.

7. A heat exchange tower comprising:
  a structure having two opposed side barrier walls, a front barrier wall having an inlet opening below a bottom edge thereof, and a rear barrier wall having an outlet opening at a generally upper region thereof;
  a fill material spanning generally horizontally across at least part of the inside of the structure, and disposed at a height above the top of the inlet opening and below the bottom of the outlet opening;
  means for blocking air protruding inwardly from the rear barrier wall inside the tower;
  a primary drift eliminator band spanning generally horizontally across at least part of the tower, and located generally at the height of the air blocking means wherein the primary drift eliminator and the air blocking means are at the same height and connect to each other.

8. A tower according to claim 7, wherein the air blocking means is located at a height above the top of the fill.

9. A tower according to claim 7, wherein the air blocking means is located at a height below the outlet opening.

10. A tower according to claim 7, further comprising a supplemental drift eliminator provided above the primary draft eliminator and adjacent an inward edge of the air blocking means.

11. A tower according to claim 7, further comprising at least one air turning vane angled in a generally vertical direction and provided below the fill media.

12. A heat exchange tower comprising:
  a structure having two opposed side barrier walls, a front barrier wall having an inlet opening below a bottom edge thereof, and a rear barrier wall having an outlet opening at a generally upper region thereof;
  a fill material spanning generally horizontally across at least part of the inside of the structure, and disposed at a height above the top of the inlet opening and below the bottom of the outlet opening;
  means for blocking air protruding inwardly from the rear barrier wall inside the tower; and
  an air inlet guide projecting outwardly from the front barrier wall above the inlet opening.

13. A method of affecting air flow in a heat exchange tower comprising:
proving a structure having opposed side barrier walls, a front barrier wall having an inlet opening below a bottom edge thereof, a rear barrier wall having an outlet opening, at a generally upper region thereof, a fan at the outlet opening, and a fill material spanning generally horizontally across at least part of the inside of the structure and disposed at a height above the top of the inlet opening and below the bottom of the outlet opening; and
directing air flow using a baffle protruding inwardly from the rear barrier wall inside the tower,
wherein a primary drift eliminator band spans generally horizontally across at least part of the tower, and is located generally at the height of the baffle, wherein the primary drift eliminator and the baffle are at the same height and connect to each other, and wherein a supplemental drift eliminator is provided above the primary draft eliminator and adjacent an inward edge of the baffle.

14. A method according to claim 13, wherein the baffle is located at a height above the top of the fill.

15. A method according to claim 13, wherein the baffle is located at a height below the outlet opening.

16. A method according to claim 13, wherein at least one air turning vane is angled in a generally vertical direction and provided below the fill media.

17. A method of affecting air flow in a heat exchange tower comprising:
providing a structure having opposed side barrier walls, a front barrier wall having an inlet opening below a bottom edge thereof, a rear barrier wall having an outlet opening, at a generally upper region thereof, a fan at the outlet opening, and a fill material spanning generally horizontally across at least part of the inside of the structure and disposed at a height above the top of the inlet opening and below the bottom of the outlet opening; and
directing air flow using a baffle protruding inwardly from the rear barrier wall inside the tower,
wherein an air inlet guide projects outwardly from the front wall above the inlet opening.

* * * * *